United States Patent [19]

West

[11] 4,183,248
[45] Jan. 15, 1980

[54] FAST RESPONSE ELECTRONIC THERMOMETER PROBE

[75] Inventor: Roger A. West, Riverton, Utah

[73] Assignee: RWB Labs, Hacienda Heights, Calif.

[21] Appl. No.: 932,034

[22] Filed: Aug. 8, 1978

[51] Int. Cl.² ............................................. G01K 7/22
[52] U.S. Cl. ............................... 73/362 AR; 338/23; 338/28
[58] Field of Search ................... 73/362 AR, DIG. 7; 338/23, 24, 28

[56] References Cited

U.S. PATENT DOCUMENTS

| | | | |
|---|---|---|---|
| 3,729,998 | 5/1973 | Mueller et al. | 73/362 AR |
| 3,834,237 | 9/1974 | Robertson | 73/DIG. 7 |
| 3,943,326 | 3/1976 | Henry | 219/499 |

Primary Examiner—S. Clement Swisher
Attorney, Agent, or Firm—Merchant, Gould, Smith, Edell, Welter & Schmidt

[57] ABSTRACT

A probe having a temperature sensor mounted in its tip for measuring the temperature of a body into which the probe is inserted, has a heating coil positioned on the shank of the probe near the tip, and a second temperature sensor in the tip area positioned generally between the coil and the first sensor. A control circuit is operative to energize the heater coil in response to differences in the temperature sensed by the two sensors, so that the shank of the probe is heated to track the temperature rise of the tip of the probe upon insertion into a body whose temperature is to be measured. This heat servo thermally isolates the tip from the remainder of the probe, and eliminates long thermal time constants which would otherwise be associated with the flow of heat from the tip area down the probe shank. The time response of the system is then limited only by the tip area of the probe, which is made of high heat conductivity materials and is in intimate thermal contact with the body whose temperature is to be measured. Readout of the sensed temperature is accomplished by circuitry connected to the tip sensor.

10 Claims, 5 Drawing Figures

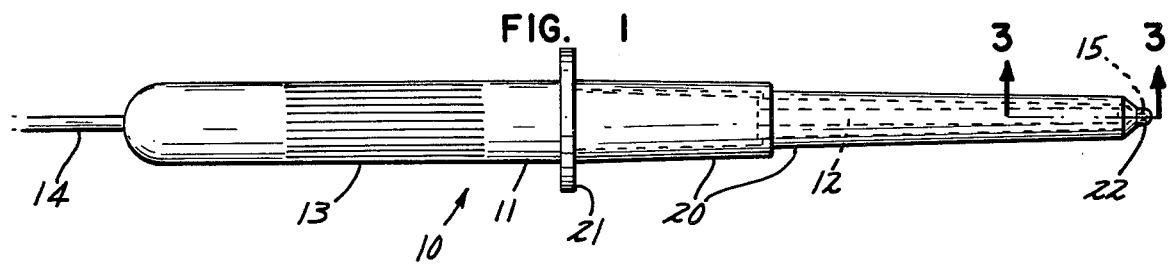
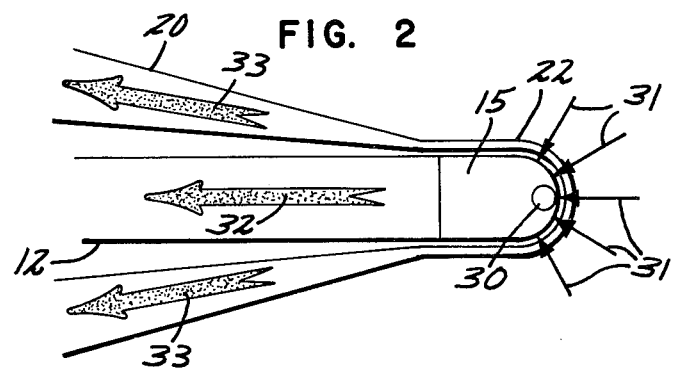
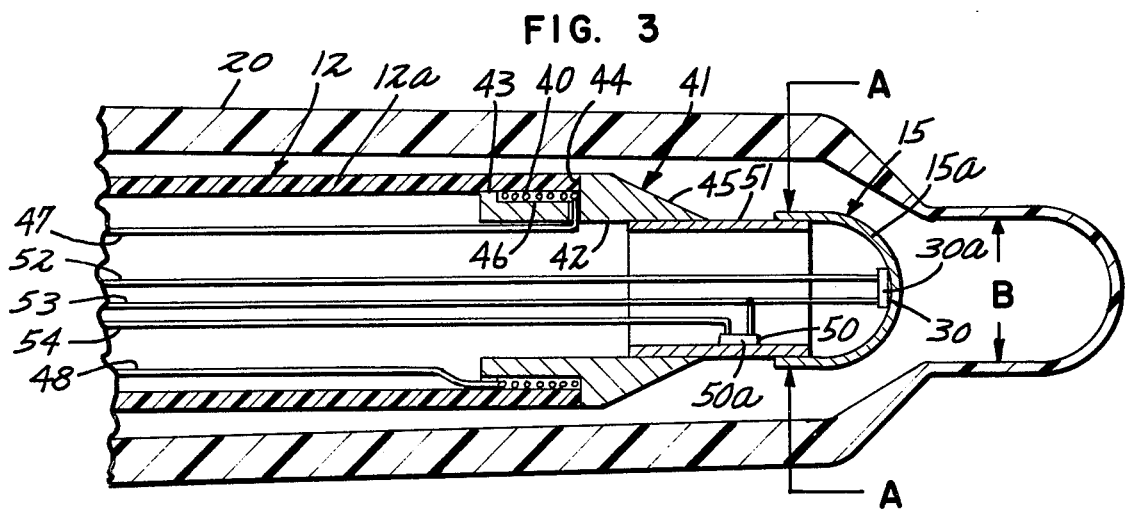
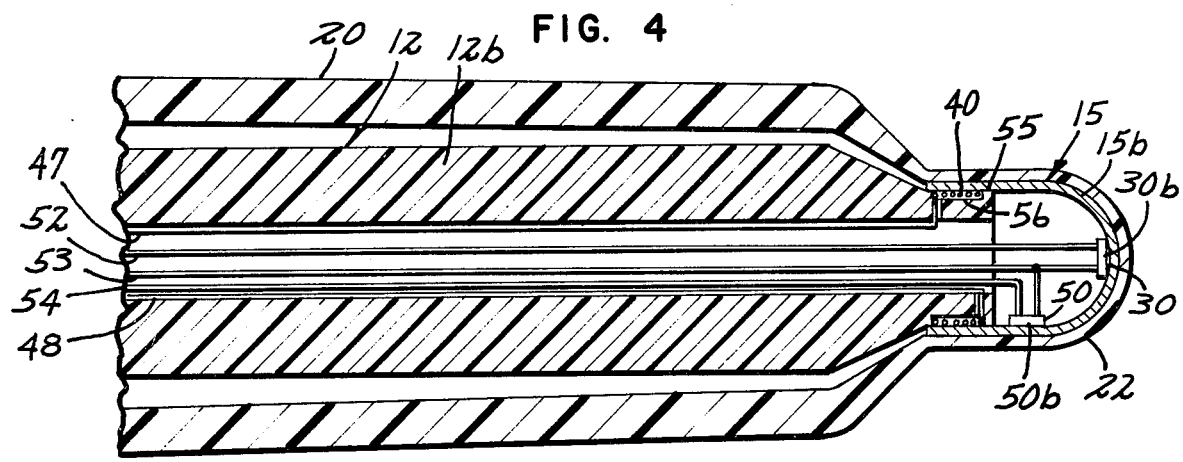

FAST RESPONSE ELECTRONIC THERMOMETER PROBE

BACKGROUND OF THE INVENTION

This invention pertains to the field of electronic thermometers, and is particularly applicable to the field of clinical electronic thermometers employing a probe for measurement of a patient's temperature, although it is equally applicable to other temperature measurement fields.

Electronic thermometers in the health care field generally take the form of a hand-held probe having an elongate shank portion with a thermistor or other temperature sensitive element therein, and a disposable probe cover or sheath fitting over the tip and shank of the probe, which is disposed and renewed for each use for anti-contamination reasons. The handle of the probe typically connects through a cable to a small chassis which includes the measurement and display circuitry, although with increasing miniaturization of electronic components, such functions can conceivably be contained in the handle of the probe. The chassis, if separate from the handle, is generally adapted for mounting on a cart or clipboard and is preferably battery operated so that a nurse or other medical personnel can take the thermometer, along with a supply of probe covers, when making rounds of patients.

Electronic thermometers offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

However, despite the above advantages of electronic thermometers, they have thus far met with only moderate acceptance in the health field. One might suppose that the reason for this is the higher cost of the unit compared with glass thermometers, but this is not believed to be the reason. The relatively low and often decreasing cost of electronic components, plus the time and labor savings potential by elimination of sterilization and handling problems with glass thermometers makes electronic thermometers economically attractive. Instead, the principal problem that has held back acceptance of electronic thermometers is their slow time response from the time the thermometer is inserted in the patient until a final stabilized reading is obtained. The problem with time response is not basically an electronic problem, since the electronic circuitry is capable of responding at rates far in excess of that of the mechanical systems involved. The problem is simply that a thermometer probe, whether an electronic thermometer probe or a glass thermometer, represents a certain amount of mass and heat capacity, and when inserted from room temperature into a body cavity it cannot change temperature instantaneously, but instead approaches its final temperature more or less exponentially. It often takes around three minutes before a final stabilized temperature is measured, either with a prior art electronic thermometer or with a glass thermometer. With the measurement time at about three minutes an electronic thermometer has an inherent disadvantage because of its cost, and under those circumstances it is often more convenient and economical to administer conventional glass thermometers to a number of patients at once for later reading, instead of having a nurse wait for a stabilized reading on an electronic thermometer at each patient.

The problem of slow time response has long been recognized in the field of electronic thermometers, and a number of different techniques have been proposed to speed up readings. One type of approach taken in the prior art is to design the probe tip and probe cover for maximum heat transfer between body tissues in contact with the cover and the actual thermistor or other sensing element. These approaches have included using a disposable probe cover that has a metal tip for higher heat conductance or one that uses an extremely thin and close fitting plastic tip. While these techniques do improve response somewhat, they cannot by themselves eliminate the unacceptable time lags, for reasons that will be pointed out in detail below.

Other prior art electronic thermometers have used extrapolation or estimation techniques to predict the final temperature value, based upon the rate of temperature rise during an initial short period following insertion of the probe into the patient. Such extrapolation or estimation techniques are based upon certain assumptions, including the assumption that the probe and cover always start each measurement from a predictable room temperature, and that the measured temperature rise of the sensor is due to a single time constant function. Unfortunately, these techniques compromise the accuracy of the system, since the estimated result depends upon the recent thermal history of the probe and cover, the ambient temperature at the time of measurement if different from that at the time of calibration, and the rate at which the probe is introduced into the patient. These variables can upset the assumptions upon which the extrapolation is based, leading to erroneous results. Accordingly, with extrapolation type prior art systems, it is still necessary to wait the full measurement time for accurate readings in important cases.

SUMMARY OF THE INVENTION

The present invention provides a means for overcoming the long time delays in obtaining readings which have heretofore plagued electronic thermometer systems. The invention accomplishes this by providing active thermal isolation of the tip of the probe from the shank and remaining portions of the probe, thereby eliminating heat transfer from the tip down the shank, and the attendant time lags involved in waiting for the entire system to reach thermal equilibrium. This is accomplished by a heating coil positioned on the shank of the probe near the tip, and a temperature tracking sensor mounted near the tip generally between the heater coil and the patient temperature sensor which is mounted at the tip of the probe. An enerization and control circuit connects to the heater and the sensors, and functions to energize the heater in response to a differential in the sensed temperature of the two sensors. The heater then supplies heat to the leakage path down the probe shank, thus isolating the tip area from having to supply heat flow to the shank from the contact zone of the body whose temperature is being measured. Because of the servo action of the control circuit, the temperature of the shank portion of the probe near the tip is made to follow, or track, the temperature rise at the tip, and the thermal response of the overall system becomes that of the probe tip, which is relatively fast. The measurement and display circuitry operates from the tip sensor, and can give stabilized final temperature readings in approximately 15 seconds.

BRIEF DESCRIPTION OF THE DRAWING

In the drawing,

FIG. 1 is an overall view of a probe, including a probe cover, for an electronic thermometer, to which the present invention can be applied;

FIG. 2 is a diagrammatic view in cross section of the tip area of a typical probe, showing the heat flow paths therein;

FIG. 3 is an enlarged sectional view of the tip area of a probe incorporating the present invention, taken generally along line 3—3 of FIG. 1;

FIG. 4 is a view similar to FIG. 3 of an alternate embodiment; and

DETAILED DESCRIPTION OF THE PREFERRED EMBODIMENT

Figure 5:
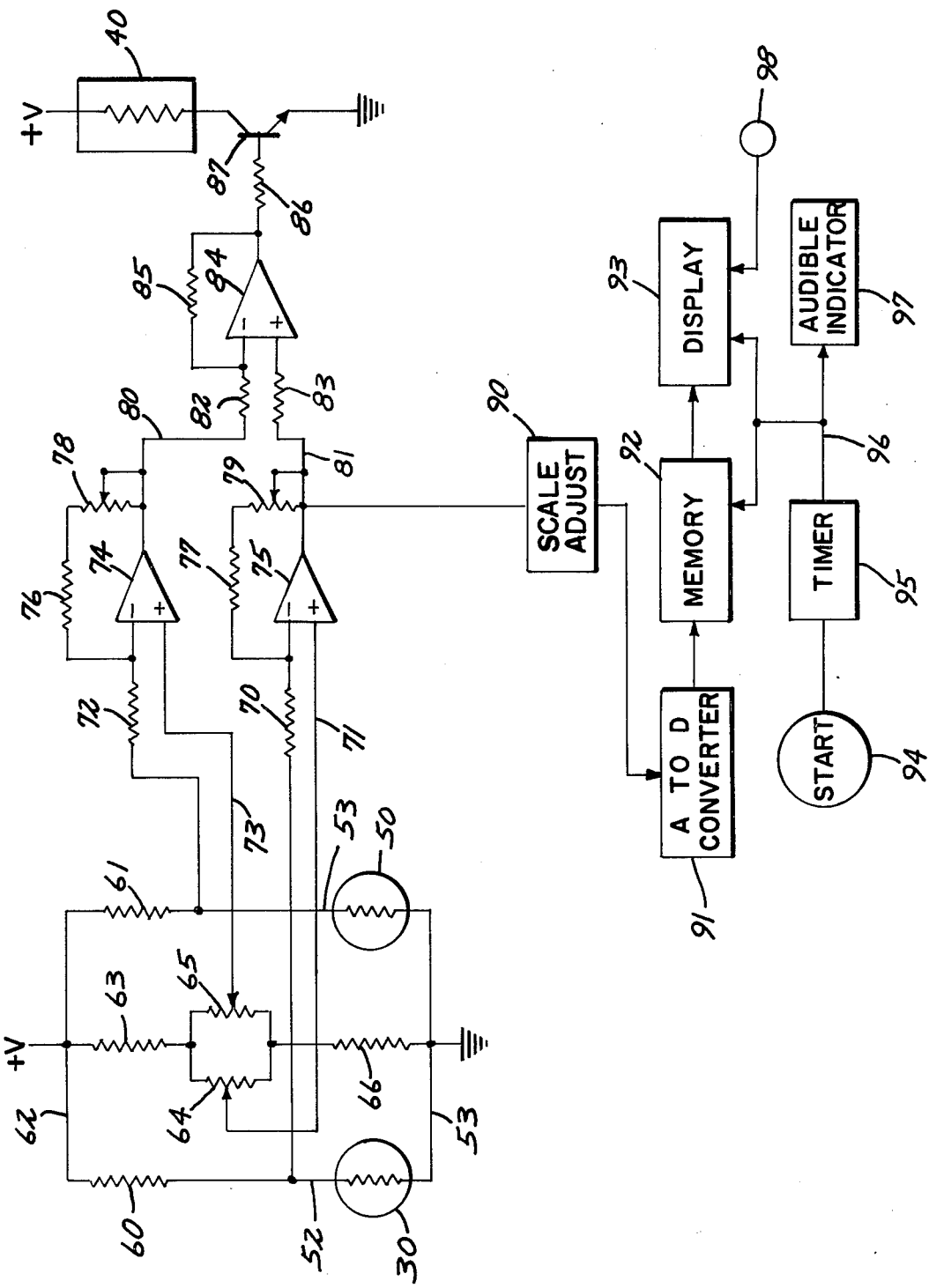
FIG. 5 is a schematic electrical diagram of the circuitry for use with the probe of FIGS. 3 or 4, according to the present invention.

In FIG. 1, reference number 10 generally designates a probe assembly for use in an electronic thermometer, and is intended to show the context in which the present invention can advantageously be applied. Generally, probe 10 comprises a handle portion 11, which may be made of plastic or any other suitable material, and an elongate shank portion 12, shown in broken line in FIG. 1. A flexible portion 13 of the handle may be provided with a switch inside as is known in the prior art, so that a squeeze of the handle can be used to activate the circuitry. A cable 14 extends from the handle to a computation and display chassis (not shown) as is generally known in the prior art. At the end of shank 12 is the tip region indicated by reference number 15.

A disposable plastic probe cover 20 is provided for fitting over the probe shank for anti-contamination purposes in taking measurements. The cover is removable for use on different patients. The probe cover includes a flange portion 21 which acts as a barrier between the patient and the handle 11, and also serves as a means for removing a used probe cover by flicking it off with the thumb. The probe cover is either stepped or tapered to a smaller diameter near the tip region, and the tip 22 of the cover is in intimate physical contact with the tip 15 of the probe.

Referring now to FIG. 2, the thermal paths within the tip area of a typical electronic thermometer probe are shown. In FIG. 2, reference number 12 again represents the shank portion of the probe. Reference number 15 represents the tip area, which usually takes the form of a rounded or hemisperical metal cap secured to the shank. Reference number 30 is the temperature sensing element, which is typically a thermistor secured in thermal contact to the tip 15. Reference number 20 indicates the disposable probe cover, and reference 22 indicates the tip area thereof, which is configured to conform to the shape of tip 15 of the probe. In FIG. 2 tip 22 of the cover is shown spaced slightly from tip 15 of the probe for purposes of clarity, but it will be understood that in practice the two are made to conform to one another as closely as possible for maximum thermal conductance.

Upon insertion of the probe end into a body cavity of the patient, heat flows inwardly through the tip 22 of the cover to tip 15 of the probe, and then to sensor 30. This heat flow path is indicated by arrows 31. This heat flow of course assumes that the body cavity is at a higher temperature than the probe and the cover prior to insertion, which is ordinarily the case. At the same time, heat is conducted from the tip area through two additional paths. One path is indicated by arrow 32, extending down the probe shank 12. The other path is indicated by arrows 33, down the probe cover.

It will be appreciated that heat will flow through all three paths until an equilibrium temperature is reached, or approximated in the entire thermal-mechanical system including and adjacent the tip region. With heat flowing through these paths, a temperature gradation exists in the structure of FIG. 2, from the highest temperature at the flesh in contact with the tip area, to the lowest temperature along the shank away from the tip area. As long as heat is flowing, the temperature gradation exists, and the temperature of sensor 30 will be lower than the temperature of the flesh in contact with the probe cover. In practice, it may take up to three minutes for an equilibrium to be reached where the temperature of the shank portion near the tip becomes high enough to reduce the heat flow to the point that the temperature of sensor 30 is within one tenth of a degree of the temperature of the flesh.

It has been recognized in the prior art that it is desirable to maintain sensor 30 in as intimate thermal contact with the flesh as possible, and for this reason a highly conductive material such as silver has often been used for the probe tip 15. Metal tips for probe covers have also been used. A high density polyethylene probe cover with an extremely thin and close fitting tip has also been developed, as shown in U.S. Pat. No. 4,022,063, and this type of cover is used with the preferred embodiment of the present invention. While these techniques are beneficial in terms of response time, they do not eliminate the problem, because as long as there is heat flow down the probe shank, a temperature gradation will exist and the temperature at sensor 30 will not be the same as the temperature of the flesh. The effect is analogous to the voltage divider effect when current flows through a resistance path.

Of the two heat conductive or leakage paths 32 and 33, path 32 down the shank of the probe is the most serious. This is because it represents a higher mass and heat capacity than cover 20, and also because it is generally in closer thermal contact with tip 15, thus providing a significant heat leakage path away from the sensor. In addition, it will be appreciated that the probe cover 20 will be in contact with flesh in the body cavity over a significant portion of its surface area in addition to the tip region, and this will provide direct heat input to the probe cover, thus diminishing the amount of heat conducted therealong away from the tip area. In this regard, it will be appreciated that the use of a disposable probe cover actually makes the heat leakage problem down path 32 worse, because the probe cover insulates the sides of the shank from heating by direct contact with flesh in the body cavity. Without a probe cover there would be a significant amount of lateral heat transfer into the shank and therefore less longitudinal heat flow down the shank away from the tip. The insulating effect of the probe cover thus serves to increase the unwanted flow of heat down path 32.

One possible solution to the heat leakage problem is to make the end of probe shank 12 of a good thermal insulating material. This approach has not proved to be successful, because the good thermal insulating materials tend to lack sufficient strength to maintain the structural integrity of the probe in actual field use.

To solve the heat leakage problem, the present invention uses "active insulation" in the form of a temperature-tracking heat servo including a separate heater element and sensor to supply heat to the shank of the probe near the tip area so as to raise its temperature to follow or track the temperature rise at the tip. By eliminating the temperature difference, heat flow away from the tip through the leakage path is eliminated, and the temperature rise of the tip upon insertion in the body cavity wall be limited only by the time constant of the heat path 31, which, as previously mentioned, can be kept to a minimum.

Referring not to FIG. 3, there is shown a tip area of a probe utilizing the preferred embodiment of the invention. The probe shank 12a comprises a tubular plastic member which is mounted to the tip assembly at one end, and the handle assembly at the other (not shown). A coupling member 41 is bonded to the end of shank 12a. In the preferred embodiment, coupling member 41 is made of brass. It has a relatively large central bore on its inside surface 42. The outside surface of coupling element 41 is stepped towards its rearward portion to receive the end of shank 12a. The reduced diameter portion is indicated by reference number 43, and the abutment flange for the probe shank is indicated by reference number 44. The forward portion 45 of coupling element 41 tapers inwardly so as to provide clearance for the probe cover when it is in place.

The rearward portion of coupling element 41 has an annular recess 46 formed therein to receive heating coil 40, which comprises a number of turns of resistance wire. A pair of lead wires 47 and 48 connect to the coil and extend through the hollow interior portion of the probe shank for connection to the circuitry as explained hereinafter.

Sleeve 51 is positioned inside the forward end of coupling element 41. Sleeve 51 is a piece of stainless steel tubing, and is secured to coupling element 41 by soldering, to ensure good thermal contact.

The tip 15a is a domed or hemispherical shaped member made of silver for high thermal conductivity. The open end of tip 15a has an inside diameter corresponding to the outside diameter of sleeve 51 so that it may telescopically fit over the end of the sleeve. The tip and sleeve are also soldered for good thermal conductivity.

The tip, or patient sensing thermistor 30a is bonded to the inside of tip 15a near the end thereof, with silver epoxy or other heat conductive adhesive for ensuring close thermal contact with the tip. The second, or temperature tracking sensor 50a is similarly mounted to the side of sleeve 51. Thermistors 30a and 50a preferably have identical characteristics, or can be equalized electronically to have the same characteristics. An electrical lead wire 52 connects to thermistor 30a, lead 54 connects to thermistor 50b, and lead 53 connects to both thermistors. The lead wires, together with leads 47 and 48, pass through the hollow interior of the probe shank ultimately to a cable for connection to the electrical circuitry as explained hereinafter.

Probe cover 20 in the preferred embodiment is of the type shown in U.S. Pat. No. 4,022,063. It utilizes a tip portion 22 shaped to conform to the rounded or domed configuration of tip 15a. The inside dimension B of the probe cover tip is slightly smaller than the outside dimension A of the probe tip 15a. This creates an interference fit when the probe cover is put in place, thus ensuring both a mechanical connection to hold the probe cover on, and also good thermal contact between the probe cover and probe tip. It will be appreciated that in FIG. 3 the probe cover is shown off the probe tip for purposes of clarity, but that in use the tip 15a would be pushed fully into the receiving portion of tip 22 of the cover. FIG. 4 shows the probe cover in place for a measurement on the alternate embodiment probe member.

In the embodiment of FIG. 4, the probe shank 12b is also made of plastic with an opening to receive the electrical leads. Probe shank 12b tapers near the tip to a reduced diameter portion indicated by reference number 55. The diameter of stepped portion 55 is small enough to telescopically fit inside the silver rounded tip member 15b, which is secured to it by a suitable adhesive. The stepped portion 55 includes an annular recess 56 which receives the windings of coil 40. Coil 40 is thus in intimate heat contact with both the probe shank and the silver probe tip.

Patient sensor 30b is secured to the inside of the end of the tip as in the previous embodiment, and the tracking thermistor 50b is secured to the side portion of the tip. Electrical lead wires for the coil and the two thermistors are connected as before, and pass through the hollow center of the probe shank for connection to the circuitry.

FIG. 5 shows the circuitry for use with either embodiment. Reference number 30 is used to designate the patient sensing thermistor, but it will be understood that this could represent either sensor 30a or 30b, depending upon which embodiment is used. Likewise, temperature tracking thermistor 50 represents either 50a or 50b. The two thermistors are connected by lead 53 to signal ground. The other side of thermistor 30 connects to resistor 60, and the other side of thermistor 50 connects to resistor 61. Both of these resistors connect to a lead 62, which connects to a source of operating voltage indicated by the symbol +V. In the preferred embodiment a battery power supply including regulation and recharging circuits are used, but these are not shown in FIG. 4 for purposes of clarity, and because such power supply circuits are well known to those skilled in the art. An additional resistor 63 connects to lead 62, and its other side connects to a pair of potentiometers 64 and 65. The other fixed terminals of the potentiometers are joined together and connect to resistor 66, whose other side connects to lead 53. The variable terminal of potentiometer 64 connects to lead 71, and the variable terminal of potentiometer 65 connects to lead 73.

A pair of operational amplifiers 74 and 75 are provided. Suitable connections to the power supply and to external stabilizing components as are generally known in the art have been omitted from FIG. 4 for purposes of clarity. The non-inverting input to amplifier 74 is connected to lead 73. The inverting input connects to resistor 72, which in turn connects from a branch of lead 53. A feedback resistor 76 and an adjustable feedback resistor 78 connect from the output of amplifier 74 at lead 80 to the inverting input. The non-inverting input of amplifier 75 connects to lead 71. The inverting input connects through resistor 70 to a branch of lead 52, and also through feedback resistor 77 and adjustable feedback resistor 79 to the amplifier output at lead 81.

Lead 81 also connects through resistor 83 to the non-inverting input of an operational amplifier 84. Lead 80 connects through resistor 82 to the inverting input thereof. The output of amplifier 84 connects through resistor 86 to the base of a transistor 87, and also to feedback resistor 85. The emitter of transistor 87 connects to signal ground, and its collector connects through heater coil 40 to the voltage supply.

The output of amplifier 75 at lead 81 is also the analog temperature measurement output, and this output voltage is applied to digital conversion and display circuitry. Since techniques and apparatus for conversion of an analog voltage for digital display are well known, the digital portion of the circuit of FIG. 4 is shown in block diagram form only. Lead 81 connects to a scale factor adjustment device 90. This device may be, for example, an operational amplifier having an adjustable resistance in its gain adjusting network. This permits adjustment of the digital circuitry to give an accurate readout in the desired units of measure. The output of adjustment network 90 connects to an analog to digital converter 91, and the digital output of the converter is applied to a memory circuit 92, and then to a digital display 93. A timer 95 provides an output at lead 96 to activate memory 92 and display 93, as well as an audible indicator 97. A start button 94, which may be in the probe handle, connects to timer 95 to initiate a measurement cycle. Display button 98 connects to energize the display.

The operation of the invention will now be explained with reference to FIGS. 3 and 5, it being understood that the embodiment of FIG. 4 operates substantially the same as FIG. 3.

The probe cover 20 is placed on the probe 10, it being understood that in use probe cover tip 22 is placed snugly on probe tip 15a, in the mannr that is shown with reference to FIG. 4. Assume for purposes of illustration that the probe and cover at this point are at room temperature, or at some other temperature lower than the temperature of the body cavity into which they are to be inserted, although this assumption is not essential to the operation of the invention. At this point both sensors 30a and 50a are at the same temperature, and have the same resistance. The left hand portion of FIG. 5 comprises a multiple wheatstone bridge circuit which is in balance when the resistance of sensors 30 and 50 are identical. Resistors 63–66 comprise the reference leg, while the legs containing the thermistors comprise the meausrement legs for the patient sensing and temperature tracking thermistors. With the bridge circuit balanced, the input voltages to amplifiers 74 and 75 are substantially identical, their outputs are also substantially identical and no appreciable current is supplied to heater coil 40.

Upon insertion of the probe and cover into the patient, the tip area 22 of the cover comes in contact with flesh and heat begins to flow through the probe cover tip 22 to the probe tip 15a, thus causing a rise in temperature of sensor 30a. A temperature gradient is thus established, and heat begins to flow along tip 15a to sleeve 51. In the absence of the present invention, heat would continue to flow through sleeve 51, coupling element 41, and probe shank 12a, as well as along the body portion of probe cover 20, as explained above. Not until those components have substantially reached the temperature of the tip would a stabilized, final temperature be sensed by sensor 30a.

However, due to the action of the present invention, the above-noted time delays are avoided. Seconds after inserted into the patient enough heat conduction through the tip will have taken place to establish the temperature gradient and raise the temperature of thermistor 30a above that of thermistor 50a. This causes an imbalance in the wheatstone bridge. Specifically, the resistance of thermistor 30 drops, lowering the voltage at lead 52 as applied to the inverting input of amplifier 75. Its output, at lead 81, therefore increases in voltage, creating an imbalance at the input to amplifier 84. This causes a positive current drive to transistor 87, causing it to conduct and draw current through heater coil 40.

The heater coil has a short heating time constant compared with the other thermal time constants of the mechanical components involved, and the coil has excellent thermal coupling with the tip. Heat from the coil begins to heat the end of the shank of probe 12a, and also the brass coupling element 41. Heat from this coupling element is applied to sleeve 51 and proceeds toward the probe tip. Sensing element 50a is in contact with the sleeve and begins to experience a rise in temperature. As its temperature rises, its resistance drops, causing an increase in the output of amplifir 74. When the temperature of sensor 50a has caught up with the rising temperature of thermistor 30a, the output of amplifier 74 reaches the output of amplifier 75, and the drive to transistor 82 is reduced, then removed, thus deenergizing heater 40. With the temperature equalized between the locations of thermistors 30a and 50a, there can be no heat flow. Specifically, there is no heat flow from the tip area down the shank of the probe. By supplying the proper amount of heat to the heater coil, the system has effectively thermally isolated the tip from the rest of the probe.

As the temperature at sensor 30a continues to rise to equal the temperature of the patient, thermal equilibrium between the two temperature sensors may again become imbalanced, but the difference will be amplified and cause heater 40 to be energized again. The response in the preferred embodiment is proportional to the temperature difference, rather than being an all-off or all-on system, although the latter type of amplification could also be used. The overall effect is that the temperature at sensor 50a is caused to track or follow the temperature at sensor 30a. With the thermal leakage paths thus "plugged", the response of the system is essentially that of the response of tip 15a, thermistor 30a and probe cover tip 22. As previously pointed out, these components have minimum mass, high heat conductivity, and intimate thermal contact with one another and with the patient. The thermal response of the tip is very fast, with stabilized final temperatures of patients being typically reached about 15 seconds starting from room temperature, compared to about 3 minutes without the use of the invention.

In practice it is advantageous to introduce the probe into the patient slowly, so as to minimize the effect of chilling the flesh by contact with the probe. If a cool member is brought into contact with the flesh, heat flow from the flesh tends to chill it below its true temperature just prior to contact, and it may take several minutes to build back up to the initial and correct temperature value. It should be appreciated that the time required to reheat the flesh is a biological phenomenon relating to the heat flow and circulation within the tissues, and does not relate significantly to the design or time constants of the probe. The chilling effect on the flesh is equally applicable with any kind of probe or with a conventional glass thermometer. Since the time response of a glass thermometer is so slow, the chilling effect is not usually noticed. However, with the high speed response of the present invention, the chilling of the flesh can become a more significant factor than the time response of the probe. Accordingly, it is advantageous to introduce the probe slowly into the patient so that the tip is prewarmed by the time it reaches the contact point for the measurement.

Because of the possibility of the flesh chilling effect, and also because it is not possible to predict the starting temperature of the probe if, for example, someone had just washed the probe in cold water, it is recommended that temperature measurements be taken after a somewhat longer period of time than the 15 second typical time measurment. Accordingly, in the preferred embodiment a 26 second time period is used to allow the temperature to stabilize before the reading is taken.

Referring again to FIG. 5, it will be appreciated that the voltage at lead 81 rises in response to the increasing temperature of patient temperature sensor 30, and this voltage is used for the readout. At the start of a measurement, the operator pushes start button 94, which starts the timer 95. At the end of 26 seconds, or such other time period as is deemed adequate, timer 95 provides an output to update memory 92 to store the then current value from converter 91. At the same time display 93 is energized to display the measured value, and audible indicator 97, which may be a bell, buzzer, tone generator or the like, is energized to indicate that the reading is completed. In order to save battery power, the timer then turns off display 93 and audible indicator 97 after another 6 seconds, but the last reading remains in memory 92, and can be recalled to the display by pushing disply button 98. For the next measurement, the probe cover is replaced, the probe placed in the patient, and the start button 94 is activated and the measurement process described above is repeated.

As previously mentioned, the preferred embodiment uses thermistors for the temperature measurement functions, although other types of temperature sensors could be used within the scope of the invention. Thermistors have a nonlinear function, and the nonlinearities are compensated for by careful resistance value selection, as is generally known in the art. Thermistors 30 and 50 not only serve to supply voltage which is a function oftemperature to amplifiers 74 and 75, but they also provide a variable resistance value which appears as one of the components in the gain equation for the amplifiers. By suitable component value selection, the gain of the amplifier can be made to vary with temperature so as to effectively compensate for the nonlinear response of the thermistors, over the desired range of measurements. The following key values were calculated and used in the preferred embodiment of the circuit of FIG. 5;

| Resistors 60 and 61 | 12.4 Kilohms, 1% |
| Resistor 63 | 53.6 Kilohms, 1% |
| Resistors 64 and 65 | 2 Kilohms |
| Resistor 66 | 49.9 Kilohms, 1% |
| Resistors 70 and 72 | 29.4 Kilohms, 1% |
| Resistor 76 | 294 Kilohms, 1% |
| Resistor 77 | 243 Kilohms, 1% |
| Resistor 78 | 100 Kilohms |
| Resistor 79 | 50 Kilohms |
| Resistors 82 and 83 | 15 Kilohms, 5% |
| Resistor 86 | 2.7 Kilohms |
| Heater 40 | 100 ohms total, wound from .001 inch diameter stainless steel resistance wire with varnish insulation |
| Thermistors 30 and 50: | |
| 14,506.9 ± 26.9 ohms at 93.00° F. | |
| 12,332.6 ± 22 ohms at 101.00° F. | |
| 10,532.0 ± 18 ohms at 109.00° F. | |
| Operational Amplifiers 74, 75 and 84: 308AN or equivalent | |
| Transistor 87: 2N2222A or equivalent | |

Potentiometer 64 is adjusted to provide the scale "zeroing" adjustment for the temperature measurement, and potentiometer 65 is adjusted for the heater "offset". Potentiometer 78 is adjusted and resistor 85 is selected to provide the desired gain for the heater system for smooth operation, and potentiometer 79 is adjusted for optimum linearizing of the measurement scale. The scale factor is adjusted by device 90, as previously explained.

While the above description has set forth the preferred embodiment of the invention as applied to the field of thermometers for use in the health care field, it will be appreciated that the fast response temperature tracking feature of the present invention is not limited to that field. Other shapes and configurations of probes can be made according to the present invention for temperature measurement in different applications. The preferred embodiment as shown herein is used with a probe cover, since such covers are customarily used for clinical thermometers. However, it will be understood from the above description, that the temperature tracking and measurement functions according to the present invention will operate just as accurately, and even faster, without the probe cover, for applications where a cover is not necessary.

The present invention thus provides an improved electronic temperature measurement probe which achieves fast thermal response through the use of a heat servo to eliminate the heat leakage path which would otherwise draw heat away from the sensing element at the tip of the probe. When used in a clinical thermometer for the health care field, the invention cuts the time required for a final stabilized reading to only a small fraction of the time that would otherwise be required.

What is claimed is:

1. Fast response clinical temperature measurement apparatus of the type having a probe with disposable plastic probe covers, comprising:
   an elongate probe member;
   a high heat conductivity tip member;
   means securing said tip member to an end of said probe;
   a disposable plastic probe cover shaped to fit over said probe member and having a tip shaped and sized to conform to said tip member for maintaining close thermal contact between said tip member and a zone of a body whose temperature is to be measured;
   a first temperature sensor mounted in close thermal contact with said tip member;
   a heater element mounted in thermal communication with said probe end and spaced apart from said first temperature sensor;
   a second temperature sensor mounted in a thermal path between said heater element and said first temperature sensor; and energization means connected to receive signals from said first and second sensors and to supply energization current to said heater element, said energization means operable during a measurement to supply current to said heater element when the temperature of said first sensor exceeds the temperature of said second sensor by more than a predetermined amount, whereby said heater element supplies heat to the probe member during a measurement to prevent unwanted heat flow from the tip member down the probe member.

2. Apparatus according to claim 1 wherein said first and second temperature sensors comprise thermistors.

3. Apparatus according to claim 1 wherein said energization means includes bridge-circuits in which said first and second temperature sensors are connected, a differential amplifier, and means connecting the bridge circuits to the differential amplifier so that an imbalance between the sensors with the first sensor warmer than the second causes energization current to be supplied to said heater element.

4. Temperature measurement apparatus, comprising:
a probe having an elongate plastic shank;
a tip assembly for said probe, including a coupling element attached to the end of the probe, a tubular portion extending from said coupling member away from said shank, and a rounded tip of high thermal conductivity metal attached to said tubular portion;
a heater element connected adjacent a portion of said coupling member in close thermal contact therewith;
a first temperature sensor attached to the inside of said rounded tip in close thermal contact therewith;
a second temperature sensor mounted on the inside of said tubular portion in close thermal contact therewith; and
an energization circuit connected to said first and second sensors and said heater element and operative to supply current to said heater element in response to a higher temperature of said first sensor with respect to the temperature of said second sensor.

5. Apparatus according to claim 4 including an elongate probe cover adapted to fit over the elongate shank of the probe, and including a rounded tip portion shaped to receive said rounded tip in close thermal contact therewith.

6. Apparatus according to claim 4 wherein said coupling element and tubular portion are made of metal having a thermal conductivity lower than said tip.

7. Apparatus according to claim 6 wherein said coupling element is made of brass, said tubular portion is made of stainless steel, and wherein said tubulr portion is soldered to said coupling element and said rounded tip for good thermal conductivity.

8. Apparatus according to claim 4 wherein said rounded tip is made of silver.

9. Apparatus according to claim 4 wherein said temperature sensors are secured to said rounded tip and tubular portion, respectively, with heat conductive adhesive.

10. Apparatus according to claim 4 wherein said heater element comprises a heater coil wound around a portion of said coupling member in close thermal contact therewith.

* * * * *